(12) United States Patent
Dayasindhu et al.

(10) Patent No.: US 8,589,205 B2
(45) Date of Patent: Nov. 19, 2013

(54) METHODS FOR SELECTING ONE OF A PLURALITY OF COMPETING IT-LED INNOVATION PROJECTS AND DEVICES THEREOF

(75) Inventors: Nagarajan Dayasindhu, Bangalore (IN); Venkatakrishnan Balasubramanian, TamilNadu (IN); Vikas Dewangan, Maharashtra (IN)

(73) Assignee: Infosys Technologies Ltd., Bangalore (IN)

( * ) Notice: Subject to any disclaimer, the term of this patent is extended or adjusted under 35 U.S.C. 154(b) by 22 days.

(21) Appl. No.: 13/216,552

(22) Filed: Aug. 24, 2011

(65) Prior Publication Data

US 2012/0296688 A1 Nov. 22, 2012

(30) Foreign Application Priority Data

May 18, 2011 (IN) .......................... 1687/CHE/2011

(51) Int. Cl.
*G06Q 10/00* (2012.01)
(52) U.S. Cl.
USPC ....................................... 705/7.23

(58) Field of Classification Search
USPC ................................. 705/7.11, 7.23
See application file for complete search history.

(56) References Cited

U.S. PATENT DOCUMENTS

| 6,853,952 | B2 * | 2/2005 | Chadwick ..................... 702/181 |
| 7,366,680 | B1 * | 4/2008 | Creel et al. .................... 705/7.17 |
| 7,669,180 | B2 * | 2/2010 | Bassin et al. ................... 717/101 |
| 7,769,618 | B2 * | 8/2010 | Levanon ....................... 705/7.22 |
| 7,962,358 | B1 * | 6/2011 | Fernandez et al. ........... 705/7.23 |
| 8,452,633 | B2 * | 5/2013 | Arlt et al. ..................... 705/7.23 |
| 2010/0138807 | A1 * | 6/2010 | Bogdan ......................... 717/101 |

* cited by examiner

*Primary Examiner* — Romain Jeanty
(74) *Attorney, Agent, or Firm* — LeClairRyan, a Professional Corporation (57) ABSTRACT

Methods, systems, and computer-readable storage media for selecting one of a plurality of information technology (IT)-led innovation projects include obtaining a plurality of IT-led innovation projects. A selection of one or more research projects for each of the obtained IT-led innovation projects is determined based at least on one or more research project criteria. One of the obtained IT-led innovation projects is selected based at least on the determined selection of one or more research projects for each of the obtained IT-led innovation projects and one or more innovation project criteria. The selection of the one of the obtained IT-led innovation projects is provided.

27 Claims, 7 Drawing Sheets

Criteria Model for Prioritization of Research Projects

| Project Domain | Dimension | Criteria | Sub-Criteria | Description |
|---|---|---|---|---|
| Research Project | Operational (Research Process) | Resource Availability | Skills Availability | Assessing how readily the suitable skill set for research can be made available |
| | | Ease of Execution | Simplicity of carrying out the Research Project(s) | Assessing how unproblematic it will be to execute the research project |
| | | | Ease of Technology Familiarization | Assessing how unproblematic it will be to acquire the requisite technical know-how if not available |
| | | | Ease of External Collaboration (if applicable) | Assessing the overall ease in engaging with third party vendors and external researchers to meet the stated objectives (if needed) |
| | | Financial Fit | Ease of Initial Investment | Assessing the ease with which the required forward investment can be made, while taking minimum risk |
| | | Strategic Fit | Alignment with Enterprise ICT Strategy | Assessing how well the research project fits with the enterprise ICT strategy |
| | | | Alignment with IT Architecture Policy | Assessing the potential compliance with IT architecture policies in terms of technology, application and data architectures. |
| | | | Compliance with Regulations and Policies | Assessing the possible impact of the research topic on regulatory compliance and compatibility with organizational policies related to the environment, health, safety etc. |
| | | | Research Project Duration | Assessing the time required to meet the research project objectives and produce the stated deliverables |
| | Business Objectives | Intellectual Capital | Contribution to Knowledge/Intellectual Capital | Assessing how the research project contributes towards development of organizational competencies by addition of knowledge and intellectual capital |
| | | | Ownership of IP | Assessing whether IP created will be solely / jointly owned by the organization and/or a partner |
| | | | Patentability | Assessing the degree to which the relevant invention can be patented |
| | | Learning and Growth | New Partnerships (or Joint Venture) Establishing Capability | Assessing the potential of the resultant invention to promote the business by establishing partnerships and/or a joint venture |
| | | | New / Enhanced Skills Creation Capability | Assessing the potential of adding new skills or enhancing the existing skillset of human resources while pursuing the research |

FIG. 5

Criteria Model for Prioritization of IT Led Innovation Projects

| Project Domain | Dimension | Sub-Dimension | Criteria | Sub-Criteria | Description |
|---|---|---|---|---|---|
| IT Led Innovation Project | Innovation Creation (i.e. the "Process of Innovation". Includes Research and/or Prototyping) | Research | Resource Availability | Skills Availability | Assessing how readily the suitable skill set for research can be made available |
| | | | Ease of Execution | Simplicity of carrying out the Research Project(s) | Assessing how unproblematic it will be to execute all the proposed Research Projects |
| | | | | Ease of External Collaboration (if applicable) | Assessing the overall ease in engaging with third party vendors and external researchers to meet the stated objectives (if needed) |
| | | Prototyping | Resource Availability | Skills Availability | Assessing how readily the suitable skill set for prototyping can be made available |
| | | | | ICT Hardware/Software Availability | Assessing how readily the required ICT Hardware/Software can be made available for prototyping |
| | | | Ease of Execution | Ease of Technology Familiarization | Assessing how unproblematic it will be to acquire the requisite technical know-how if not available |
| | | | | Simplicity of carrying out the Prototyping Project(s) | Assessing how unproblematic it will be to execute all the proposed Prototyping Projects |
| | | | | Ease of External Collaboration (if applicable) | Assessing the overall ease in engaging with third party vendors and external researchers to create the prototype (if needed) |
| | Innovation Adoption (i.e. the "Process of Utilization" of the Innovation by the organization. Includes Implementation and Diffusion) | Implementation | Resource Availability | Skills Availability | Assessing how readily the suitable skill set for Innovation Project Implementation can be made available |
| | | | | ICT Hardware/Software Availability | Assessing how readily the required ICT Hardware/Software can be made available for Innovation Project Implementation |
| | | | Ease of Execution | Ease of Technology Familiarization | Assessing how unproblematic it will be to acquire the requisite technical know-how if not available |
| | | | | Simplicity of Carrying Out the Implementation Project | Assessing how difficult it will be to carry out implementation of the IT Led Innovation Project |
| | | Diffusion | Enabling Diffusion | Ease of Organizational Change | Assessing how easy it will be to reorganize / realign / institutionalize cultural changes in the organization |
| | | | | Ease of Publicizing / Marketing | Assessing how easy it will be to spread the message / market to prospective internal and/or external consumers |
| | | | Customer Adoption (Internal / External) | Estimated Rate of Internal / External Customer Adoption | Assessing how readily internal / external consumers will buy and/or adopt the new product or service |
| | Customer Orientation | Customer Delight (Internal / External Customers) | Attractiveness | Innovation Novelty and Attractiveness | Assessing how appealing the new or enhanced product / service will be for prospective internal / external customers |
| | | | Alignment with Goals | Alignment with Internal / External Customers' Business Objectives | Assessing the extent to which the new or enhanced product / service will help internal / external customers meet their business objectives |
| | | | | Alignment with End User Objectives | Assessing the extent to which the new or enhanced product / service will be beneficial and therefore compelling for end users |

FIG. 6A

| Criteria Model for Prioritization of IT Led Innovation Projects | | | | | |
|---|---|---|---|---|---|
| Project Domain | Dimension | Sub-Dimension | Criteria | Sub-Criteria | Description |
| IT Led Innovation Project | Business Alignment | Business Objectives | Commercial Viability | Ease of Initial Investment | Assessing the ease with which the required forward investment can be made, while taking minimum risk |
| | | | | Return On Investment / NPV | Assessing the degree of ROI / NPV anticipated from the innovation project |
| | | | | Revenue Generating Capability | Assessing how the project impacts an increase in revenue generating capability. This also accounts for the potential market size. |
| | | | Strategic Fit | Alignment with Business Strategy | Assessing how well the innovation project fits with the organization's business strategy |
| | | | | Alignment with Enterprise ICT Strategy | Assessing how well the innovation project fits with the enterprise ICT strategy |
| | | | | Alignment with IT Architecture Policy | Assessing how the well the project is compliant with IT architecture policies in terms of technology, application and data architectures. |
| | | | | Compliance with Regulations and Policies | Assessing the impact on regulatory compliance and compatibility with organizational policies related to the environment, health, safety etc |
| | | | | Time To Market | Assessing the duration from start of the Innovation Project to roll out of the new or enhanced product / service |
| | | | Market Expansion | Brand Value and Visibility | Assessing the extent to which the innovation will impact the brand value and visibility of the brand in the market |
| | | | | Competitive Differentiation | Assessing the extent to which the innovation will differentiate the organization / product / service in the market |
| | | | | New Market Penetration Capability | Assessing the potential of the innovation to penetrate untapped markets and/or customer segments |
| | | | | Decrease in Customer Attrition | Assessing the potential of the innovation to result in retention / decreased attrition of existing customers |
| | | | Intellectual Capital | Contribution to Knowledge/Intellectual Capital | Assessing how the innovation project contributes towards development of organizational competencies by addition of knowledge and intellectual capital |
| | | | | Ownership of IP | Assessing whether IP created will be solely / jointly owned by the organization and/or a partner |
| | | | | Patentability | Assessing the degree to which the relevant innovation can be patented |
| | | | Learning and Growth | New Partnerships (or Joint Venture) Establishing Capability | Assessing the potential of the innovation to promote the business by establishing partnerships and/or a joint venture |
| | | | | New / Enhanced Skills Creation Capability | Assessing the potential of adding new skills or enhancing the existing skillset of human resources while pursuing the innovation |
| | | | | Organizational Infrastructure Improvement Capability *(includes processes, culture)* | Assessing the potential of improving the existing infrastructure of the organization like systems, processes, culture etc. |

FIG. 6B

METHODS FOR SELECTING ONE OF A PLURALITY OF COMPETING IT-LED INNOVATION PROJECTS AND DEVICES THEREOF

This application claims the benefit of Indian Patent Application Filing No. 1687/CHE/2011, filed May 18, 2011, which is hereby incorporated by reference in its entirety.

FIELD

This technology generally relates to methods for selecting projects and, more particularly, relates to methods for selecting one of a plurality of competing information technology (IT)-led innovation projects and devices thereof.

BACKGROUND

Implementing an information technology (IT)-led innovation project involves exploring the feasibility of transforming an idea into a profitable product or service. Such exploration may necessarily require the execution of one or more research projects. In this context, organizations are often faced with a complex choice of having to strategically select an IT-led innovation project from a pool of competing projects, each of which may in turn require a selection amongst research projects. Typically, organizations will make such choices using a single-tier approach—that is, they will select an IT-led innovation project without fully considering or selecting the optimal associated research projects. The lack of a rigorous, integrated methodology by which such multi-tiered projects can be evaluated can result in a sub-optimal choice leading to lost opportunity costs.

SUMMARY

An exemplary method for selecting one of a plurality of information technology (IT)-led innovation projects includes obtaining, at a project selection computing device, a plurality of IT-led innovation projects. A selection of one or more research projects for each of the obtained IT-led innovation projects is determined with the project selection computing device based at least on one or more research project criteria. One of the obtained IT-led innovation projects is selected with the project selection computing device based at least on the determined selection of one or more research projects for each of the obtained IT-led innovation projects and one or more innovation project criteria. The selection of the one of the obtained IT-led innovation projects is provided with the project selection computing device.

An exemplary computer-readable storage medium having stored thereon instructions for selecting one of a plurality of IT-led innovation projects. The instructions include machine executable code which, when executed by at least one processor, causes the processor to perform steps including obtaining a plurality of IT-led innovation projects. A selection of one or more research projects for each of the obtained IT-led innovation projects is determined based at least on one or more research project criteria. One of the obtained IT-led innovation projects is selected based at least on the determined selection of one or more research projects for each of the obtained IT-led innovation projects and one or more innovation project criteria. The selection of the one of the obtained IT-led innovation projects is provided.

An exemplary project selection computing device including one or more processors and a memory coupled to the one or more processors which are configured to execute programmed instructions stored in the memory, the programmed instructions including obtaining a plurality of IT-led innovation projects. A selection of one or more research projects for each of the obtained IT-led innovation projects is determined based at least on one or more research project criteria. One of the obtained IT-led innovation projects is selected based at least on the determined selection of one or more research projects for each of the obtained IT-led innovation projects and one or more innovation project criteria. The selection of the one of the obtained IT-led innovation projects is provided.

This technology provides more effective and efficient methods and devices for evaluating competing information technology (IT)-led innovation projects. Additionally, this technology provides a systematic, integrated methodology by which such multi-tier projects and their associated sub-projects can be rigorously evaluated. Beneficially, the selection of IT-led innovation projects may now be made based on the benefits that may accrue to the organization, business alignment, and feasibility of execution.

BRIEF DESCRIPTION OF THE DRAWINGS

FIG. 5 is an exemplary criteria model against which a research project may be evaluated; and FIGS. 6A-6B depict an exemplary criteria model against which an IT-led innovation project may be evaluated.

DETAILED DESCRIPTION

This technology is directed to methods, systems, and computer-readable storage media for selecting one of a plurality of competing multi-tier projects. Such multi-tier projects may include, for example, information technology (IT)-led innovation projects, wherein each IT-led innovation project is associated with a set of a plurality of sets of one or more competing research projects.

Figure 1:
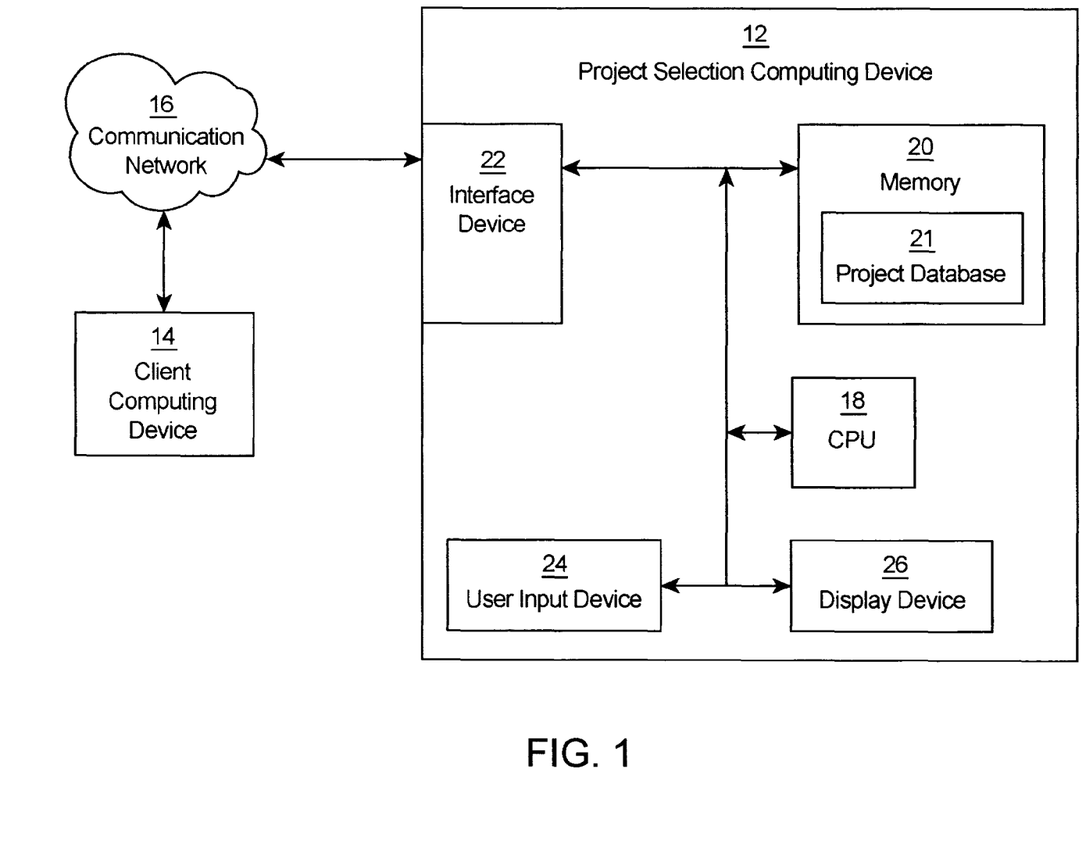
FIG. 1 is a block diagram of an environment with an exemplary project selection computing device.

Referring more specifically to FIG. 1, an environment 10 with an exemplary project selection computing device 12 is illustrated. The environment 10 includes the project selection computing device 12 and one or more client computing devices 14 which are all coupled together by one or more communication networks 16, although this environment can include other numbers and types of systems, devices, components, and elements in other configurations. This technology provides a number of advantages including providing more effective and efficient methods and devices for evaluating competing information technology (IT)-led innovation projects. Additionally, this technology provides a systematic, integrated methodology by which such multi-tier projects and their associated sub-projects can be rigorously evaluated.

In this example, the project selection computing device 12 obtains a plurality of IT-led innovation projects; determines a selection of one or more research projects for each of the obtained IT-led innovation projects based at least on one or more research project criteria; selects one of the obtained IT-led innovation projects based at least on the determined selection of one or more research projects for each of the obtained IT-led innovation projects and one or more innovation project criteria; and provides the selection of the one of the obtained IT-led innovation projects; although other numbers and types of functions could be performed. The project selection computing device 12 includes a central processing unit (CPU) or processor 18, a memory 20 with a project database 21, an interface device 22, a user input device 24, and a display device 26 which are coupled together by a bus or other link, although other numbers and types of systems, devices, components, and elements in other configurations and locations can be used. The processor 18 in the project selection computing device 12 executes a program of stored instructions for one or more aspects of the present technology as described and illustrated by way of the examples herein, although other types and numbers of processing devices and logic could be used and the processor could execute other numbers and types of programmed instructions.

The memory 20 in the project selection computing device 12 stores these programmed instructions for one or more aspects of the present technology as described and illustrated herein, although some or all of the programmed instructions could be stored and executed elsewhere. In this example, the memory 20 includes the project database 21 which is an MS SQLServer database for projects, although other types of databases which are stored at other locations could be used. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18 in the project selection computing device 12, can be used for the memory 20 in the project selection computing device 12.

The interface device 22 in the project selection computing device 12 may be used to operatively couple and communicate between the project selection computing device 12 and the one or more client computing devices 14 via one or more of the communications networks 16, although other types and numbers of communication networks or systems with other types and numbers of connections and configurations can be used. By way of example only, the one or more communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The user input device 24 in the project selection computing device 12 includes a computer keyboard and a computer mouse, although other types and numbers of user input devices can be used. In this example, the user input device 24 in the project selection computing device 12 may be used to input IT-led innovation project criteria and metrics and/or research project criteria and metrics, although other types of data and information could be entered in other manners.

The display device 26 in the project selection computing device 12 include a computer display screen, such as a CRT or LCD screen, although other types and numbers of displays could be used. In this example, the display device 26 in the project selection computing device 12 may be used to display various IT-led innovation project criteria and metrics and/or research project criteria and metrics, although other types of data and information and other types of graphical user interfaces could be displayed.

Each of the one or more client computing devices 14 includes a central processing unit (CPU) or processor, a memory, an interface device, a user input device, and a display which are coupled together by a bus or other link, although each could comprise other numbers and types of devices, elements, and components in other configurations. Each of the one or more client computing devices 14 may be remotely located from the project selection computing device 12, although other configurations could be used. The processor in the each of the one or more client computing devices 14 can execute a program of stored instructions for one or more aspects of the present technology as described and illustrated by way of the examples herein, although other types and numbers of processing devices and logic could be used and the processor could execute other numbers and types of programmed instructions. The display of each of the one or more client computing devices 14 may be used to display a user based interface (e.g., Excel) with one or more form fields. The user input device of each of the one or more client computing devices 14 may be used to input the project data in the form fields of the user based interfaces which are configured to directly provide the project data to the project selection computing device 12 for selecting one of a plurality of IT-led innovation projects, although other types and numbers of functions could be performed. Although one client computing device 14 is shown, other numbers of client computing devices and other types and numbers of systems and devices which can display and provide interaction with the user based interface can be used.

Although examples of the project selection computing device 12 and the one or more client computing devices 14 are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

The present disclosure involves evaluating competing information technology (IT)-led innovation projects, wherein each IT-led innovation project is associated with a set of a plurality of sets of one or more competing research projects. This technology provides a systematic, integrated methodology by which such multi-tier projects and their associated sub-projects can be rigorously evaluated. Beneficially, the selection of IT-led innovation projects may now be made based on the benefits that may accrue to the organization, business alignment, and feasibility of execution. Moreover, the methods discussed herein can be extended to other pools of competing multi-tier (e.g., three-tier, four-tier, etc.) projects.

Figure 2:
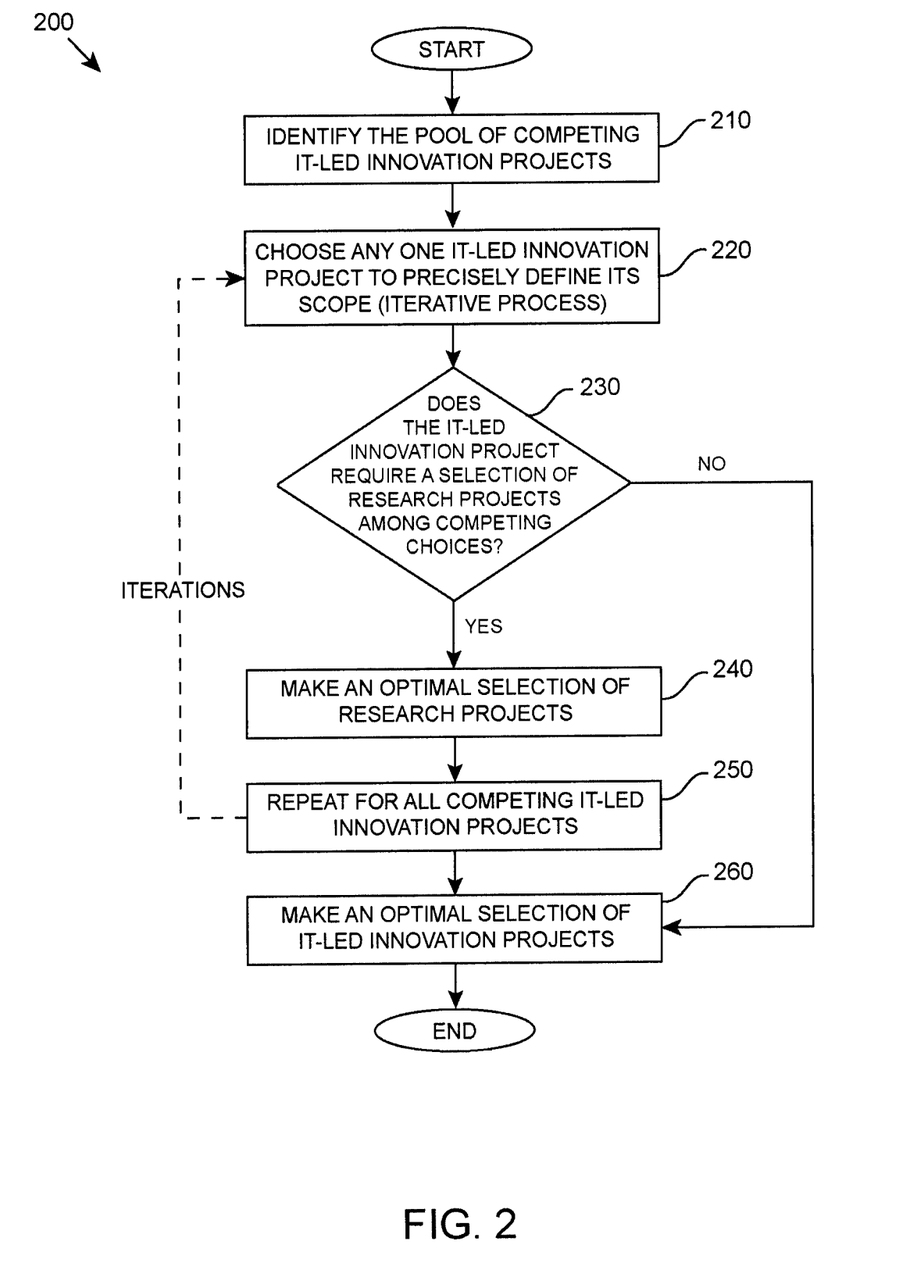
FIG. 2 is a flowchart of an exemplary method for selecting one of a plurality of competing IT-led innovation projects.

FIG. 2 is a flowchart of an exemplary method 200 for selecting one of a plurality of competing IT-led innovation projects. That is, FIG. 2 exemplifies a method by which a pool of competing two-tier projects may be evaluated. With reference to FIG. 1, the method 200 includes a project selection computing device 12 identifying a pool of competing IT-led innovation projects (block 210). For each one of the IT-led innovation projects (block 220), the project selection computing device 12 determines whether there are associated competing research projects (block 230). If so, the project selection computing device 12 selects a preferred or optimal research project (block 240). After a preferred research project has been chosen for each of the IT-led innovation projects (block 250), the project selection computing device 12 then selects a preferred or optimal IT-led innovation project (block 260).

Figure 3:
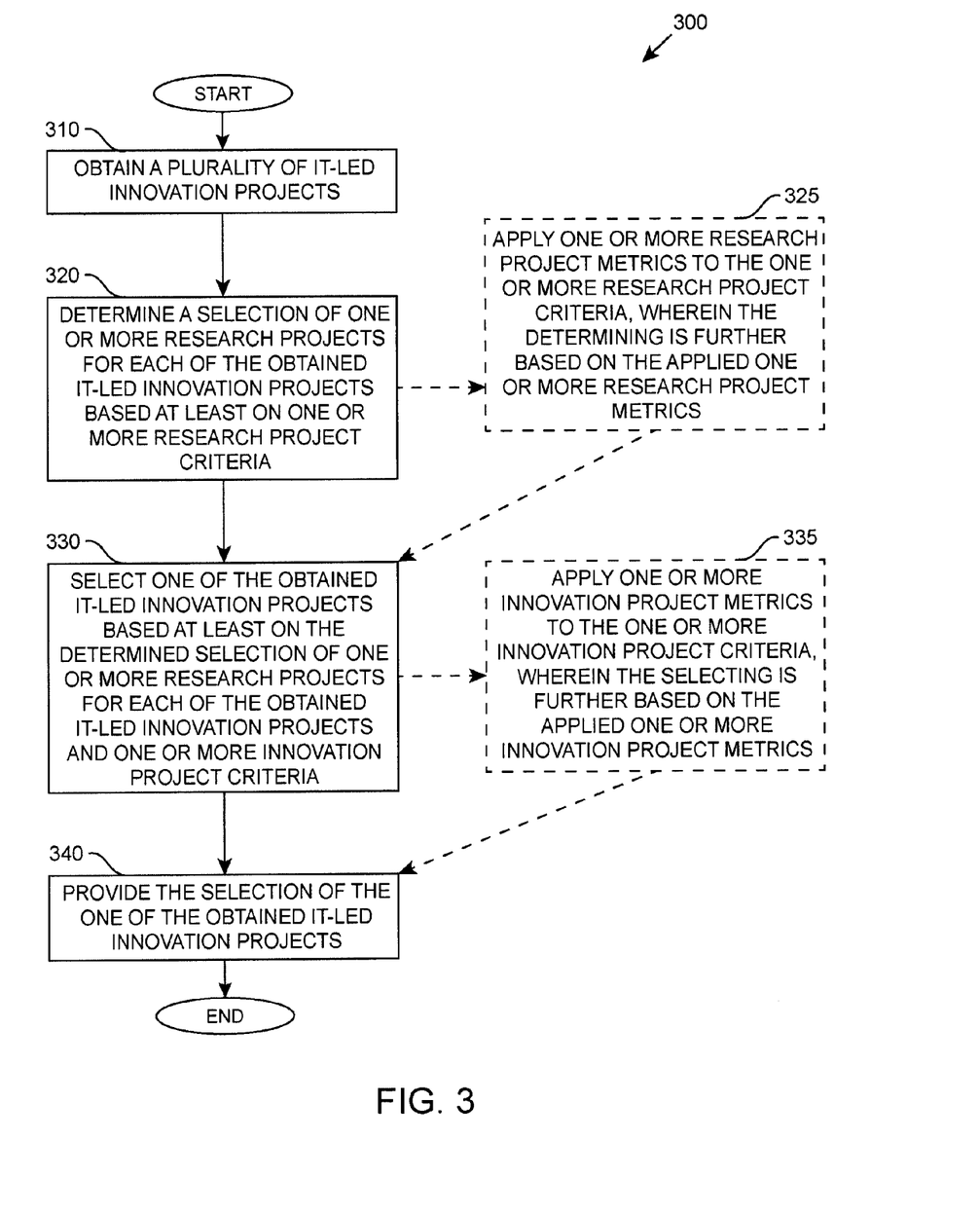
FIG. 3 is a flowchart of another exemplary method for selecting one of a plurality of competing IT-led innovation projects.

FIG. 3 is a flowchart of another exemplary method 300 for selecting one of a plurality of competing IT-led innovation projects. Referring to FIG. 2, FIG. 3 depicts exemplary steps that may be included in blocks 240 and 260. For example, the selection of a preferred research project in block 240 of FIG. 2 may be achieved in the manner described in blocks 320-325 of FIG. 3. Also, the selection of a preferred IT-led innovation project in block 260 of FIG. 2 may be achieved in the manner described in block 330-335 of FIG. 3.

In particular, project selection computing device 12 obtains a plurality of IT-led innovation projects (block 310). Project selection computing device 12 determines a selection of one or more research projects for each of the obtained IT-led innovation projects based at least on one or more research project criteria (block 320). Then, project selection computing device 12 selects one of the obtained IT-led innovation projects based at least on the determined selection of one or more research projects for each of the obtained IT-led innovation projects and one or more innovation project criteria. (block 330). The selection of the one of the obtained IT-led innovation projects is provided by project selection computing device 12 (block 340).

In some embodiments, the determining (block 320) may further include applying, with the project selection computing device 12, one or more research project metrics to the one or more research project criteria (block 325). The project selection computing device 12 may determine the selection of one or more research projects for each of the obtained IT-led innovation projects based on the applied one or more research project metrics (block 325).

In some embodiments, the selecting (block 330) may further include applying, with the project selection computing device 12, one or more innovation project metrics to the one or more innovation project criteria (block 325). The project selection computing device 12 may select one of the obtained IT-led innovation projects based on the applied one or more innovation project metrics (block 335).

In some embodiments, the research project criteria and the innovation project criteria are mutually exclusive. In other embodiments, the research project criteria and the innovation project criteria may overlap. In some of these embodiments, each of the research project criteria and the innovation project criteria may include, for example, customer orientation, commercial viability, strategic fit, resource availability, ease of execution, financial fit, learning and growth, enabling diffusion, customer adoption, customer delight, market expansion, intellectual capital, or any combination thereof.

In some embodiments, the research project and innovation project criteria models may be hierarchical models including one or more sub-criteria that are defined under the criteria. Some examples of research project and innovation project criteria and their associated sub-criteria are depicted in FIGS. 5-6.

Figure 4:
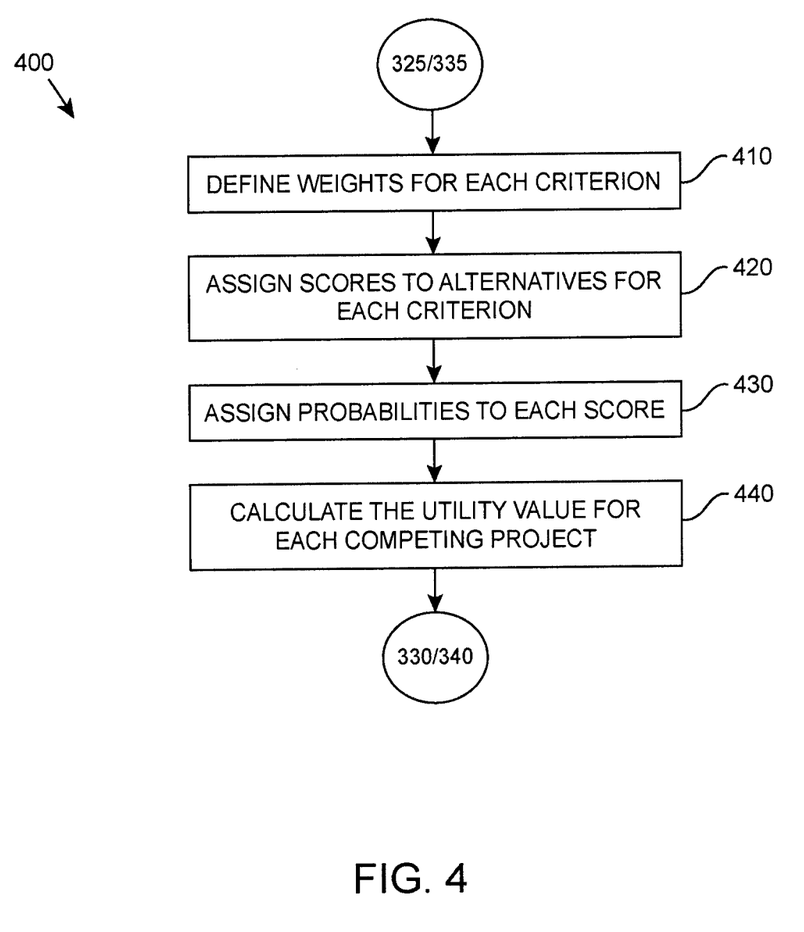
FIG. 4 is a flowchart of an exemplary method for applying a plurality of metrics to criteria of a criteria model associated with a pool of competing projects and computing a utility value for each competing project.

FIG. 4 is flowchart of an exemplary method 400 for applying a plurality of metrics to criteria of a criteria model associated with a pool of competing projects and computing a utility value for each competing project. Referring to FIG. 3, FIG. 4 depicts exemplary steps that may be included in blocks 325 and 335. For example, applying one or more research project metrics (block 325) may include obtaining, by the project selection computing device 12, a research project weight for each of the one or more research project criteria (block 410). The research project weights may be defined based on a relative impact of the one or more criteria in evaluating a feasibility of implementing the research project. Applying one or more innovation project metrics (block 335) may include obtaining, by the project selection computing device 12, an innovation project weight for each of the one or more innovation project criteria (block 410). The innovation project weights may be defined based on a relative impact of the one or more innovation project criteria in evaluating a feasibility of implementing the IT-led innovation project. In various embodiments, the sum of the weights defined for all criteria in a criteria model may equal one.

In some embodiments, research project and innovation project weights may be obtained, by the project selection computing device 12, for each sub-criteria associated with the research project and innovation project criteria. The overall weight of every sub-criterion may be calculated by multiplying the weight defined for the sub-criterion with the weight of the criterion that is above the sub-criterion in the hierarchical model, and so on until the topmost criterion is reached. In various embodiments, the sum of the weights defined for all the sub-criteria defined under each criterion may also equal one. In this way, the sum of the overall weights assigned to all the sub-criteria under each criterion may equal the weight of the criterion.

In some embodiments, the weights (and/or overall weights) may be defined by experts or by key decision makers within the organization who are charged with evaluating the pool of competing IT-led innovation projects. Alternatively or additionally, the process by which the weights are defined may be automated (e.g., weights may be defined by project selection computing device 12).

Blocks 325 and 335 of FIG. 3 may further include assigning scores to each of the competing projects (block 420). For example, research project scores may be obtained, by project selection computing device 12, for each of the research projects based on a predefined scale, with reference to each of the one or more research project criteria (block 420). Similarly, innovation project scores may be obtained, by project selection computing device 12, for each of the plurality of competing IT-led innovation projects based on a predefined scale, with reference to each of the one or more innovation project criteria (block 420). In some embodiments, scores may only be assigned to the sub-criteria of the criteria model. In some embodiments, the predefined scales may be customized (e.g., for a particular project selection scenario). In some embodiments, the scores may be assigned by experts or by key decision makers within the organization who are charged with evaluating the pool of competing IT-led innovation projects. Alternatively or additionally, the process by which the scores are assigned may be automated (e.g., scores may be assigned by project selection computing device 12).

An exemplary scale for assigning scores to the research project and innovation project criteria may be as follows:

| | |
|---|---|
| No Value | 0-4 |
| Low Value | 5-8 |
| Moderate Value | 9-12 |
| High Value | 13-16 |
| Very High Value | 17-20 |

Blocks 325 and 335 of FIG. 3 may further include assigning probabilities to each of the scores (block 430). For example, a research project probability may be obtained by project selection computing device 12 for each of the obtained research project scores (block 430). The research project probability may be a measure of uncertainty in the research project score. Similarly, an innovation project probability may be obtained by project selection computing device 12 for each of the obtained innovation project scores (block 430). The innovation project probability may be a measure of uncertainty in the innovation project score. In some embodiments, the lowest score may be assigned a probability of 0, and the highest score may be assigned a probability of 1. The other scores may be assigned probabilities between 0 and 1 according to the degree of uncertainty of the scores. In some embodiments, the probabilities for the intermediate scores may be calculated based on the "standard gambling" technique, as suggested by Keeney R L, Raiffa I I, "Decisions with multiple objectives: preferences and value tradeoffs," Cambridge University Press, 1993.

In some embodiments, the probabilities may be assigned by experts or by key decision makers within the organization who are charged with evaluating the pool of competing IT-led innovation projects. Alternatively or additionally, the process by which the probabilities are assigned may be automated (e.g., probabilities may be assigned by project selection computing device 12).

Blocks 325 and 335 of FIG. 3 may further include calculating utility values for each competing project (block 440). For example, a research project utility value may be calculated, by project selection computing device 12, for each of the research projects, with reference to each of the one or more research project criteria (block 440). Each research project utility value may be calculated based on the research project weights and the research project probabilities associated with the research project. Similarly, an innovation project utility value may be calculated, by project selection computing device 12, for each of the plurality of competing IT-led innovation projects, with reference to each of the one or more innovation project criteria (block 440). Each innovation project utility value may be calculated based on the innovation project weights and the innovation project probabilities associated with the IT-led innovation project.

In some embodiments, a utility value may be calculated by multiplying the weights defined for the criteria and the respective probabilities assigned to the scores of the criteria. An overall utility value may be calculated for a project by adding the utility values calculated for each criteria of the associated criteria model. In some embodiments, a utility value may be calculated by multiplying the probabilities assigned to the criteria with their respective overall weights.

Referring back to blocks 320 and 330 in FIG. 3, the selecting, by project selection computing device 12, of a preferred project may, in some examples, be based on the calculated utility values. For example, the determination of a selection of the one or more research projects may be based on the calculated research project utility values. Alternatively or additionally, the selecting of one of the obtained IT-led innovation projects may be based on the calculated innovation project utility values.

FIG. 5 is an exemplary criteria model against which a research project may be evaluated. In particular, FIG. 5 depicts and describes exemplary research project criteria and research project sub-criteria which may be used to evaluate a research project.

FIGS. 6A-6B depict an exemplary criteria model against which an IT-led innovation project may be evaluated. In particular, FIGS. 6A-6B depict and describe exemplary innovation project criteria and innovation project sub-criteria which may be used to evaluate an IT-led innovation research project.

Consider, for example, the following sample of criteria and sub-criteria for an IT-led innovation project:

| Criterion | Sub-criterion | Description |
|---|---|---|
| Ease of Execution | Simplicity of Carrying out the Research Project | To assess how unproblematic it will be to execute the preferred research project. |
| | Ease of External Collaboration | To assess the overall ease in engaging with third party vendors and external researchers to meet the stated objectives. |
| Resource Availability | Skills Availability | To assess how readily the suitable skill set for prototyping can be made available. |
| | Hardware/Software Availability | To assess how readily the required hardware/software can be made available for prototyping. |

In an embodiment utilizing method 400, the weights for the criteria and sub-criteria may be defined as follows:

| Criterion | $W_C$ | Sub-criterion | $W_{SC}$ | Overall Weight |
|---|---|---|---|---|
| Ease of Execution | 0.6 | Simplicity of Carrying out the Research Project | 0.7 | 0.42 |
| | | Ease of External Collaboration | 0.3 | 0.18 |
| Resource Availability | 0.4 | Skills Availability | 0.4 | 0.16 |
| | | Hardware/Software Availability | 0.6 | 0.24 |

In this example, the sum of the weights assigned to the criteria is equal to one. The sum of the weights assigned to all the sub-criteria under each criterion is also equal to one. The overall weight of each sub-criterion is calculated by multiplying the weight assigned to the sub-criterion with the weight assigned to the criterion under which the sub-criterion has been defined. In this way, the sum of the overall weights assigned to all the sub-criteria under each criterion is equal to the weight of the criterion.

Scores may, for example, be assigned to each of the sub-criteria according to a predefined scale as follows:

| Sub-Criterion | IT-Led Innovation | IT-Led Innovation | IT-Led Innovation |
|---|---|---|---|
| Simplicity of Carrying out the Research Project | 10 | 12 | 16 |
| Ease of External Collaboration | 12 | 10 | 15 |
| Skills Availability | 8 | 12 | 6 |
| Hardware/Software Availability | 14 | 18 | 9 |

Probabilities may, for example, be assigned to each of the scores as follows:

| Sub-Criterion | IT-Led Innovation | IT-Led Innovation | IT-Led Innovation |
|---|---|---|---|
| Simplicity of Carrying out the Research Project | 0 | 0.8 | 1 |
| Ease of External Collaboration | 0.9 | 0 | 1 |
| Skills Availability | 0.7 | 1 | 0 |
| Hardware/Software Availability | 0.4 | 1 | 0 |

Utility values may, for example, be calculated by multiplying the probabilities assigned to the sub-criteria with the overall weight of the sub-criteria:

| Sub-Criterion | IT-Led Innovation | IT-Led Innovation | IT-Led Innovation |
|---|---|---|---|
| Simplicity of Carrying out the Research Project | 0 | 0.336 | 0.42 |
| Ease of External Collaboration | 0.162 | 0 | 0.18 |
| Skills Availability | 0.112 | 0.16 | 0 |
| Hardware/Software Availability | 0.096 | 0.24 | 0 |
| Overall Utility Value | 0.37 | 0.736 | 0.6 |

In one embodiment, a highest utility value may indicate that IT-Led Innovation Project 2 is the project which is to be selected. In other embodiments, any suitable condition, scale, or function upon the utility value may be used to determine which project is to be selected.

Alternatively or additionally, the methods depicted in FIGS. 2-4 may be iteratively performed in the manner described above to accommodate the evaluation of other pools of competing multi-tier (e.g., three-tier, four-tier, etc.) projects.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for selecting one of a plurality of information technology (IT)-led innovation projects, the method comprising:

obtaining, at a project selection computing device, a plurality of IT-led innovation projects;

determining, with the project selection computing device, a selection of one or more research projects for each of the obtained IT-led innovation projects based at least on one or more research project criteria;

selecting, with the project selection computing device, one of the obtained IT-led innovation projects based at least on the determined selection of one or more research projects for each of the obtained IT-led innovation projects and one or more innovation project criteria; and wherein at least one of:

the determining further comprises obtaining, by the project selection computing device, a research project weight for at least one of the one or more research project criteria and applying, by the project selection computing device, one or more research project metrics to the one or more research project criteria with the obtained research project weight applied to the at least one of the one or more research project criteria, the research project weight is defined based on a relative impact of the at least one of the one or more research project criteria in evaluating a feasibility of implementing the research project; or the selecting further comprises obtaining, by the project selection computing device, an innovation project weight for at least one of the one or more innovation project criteria and applying, by the project selection computing device, one or more innovation project metrics to the one or more innovation project criteria with the obtained innovation project weight applied to the at least one of the one or more innovation project criteria, the innovation project weight is defined based on a relative impact of the at least one of the one or more innovation project criteria in evaluating a feasibility of implementing the IT-led innovation project;

providing, with the project selection computing device, the selection of the one of the obtained IT-led innovation projects.

2. The method as set forth in claim 1, wherein each of the research project criteria and the innovation project criteria comprises at least one of customer orientation, commercial viability, strategic fit, resource availability, ease of execution, financial fit, learning and growth, enabling diffusion, customer adoption, customer delight, market expansion, or intellectual capital.

3. A method for selecting one of a plurality of information technology (IT)-led innovation projects, the method comprising:

obtaining, at a project selection computing device, a plurality of IT-led innovation projects;

determining, with the project selection computing device, a selection of one or more research projects for each of the obtained IT-led innovation projects based at least on one or more research project criteria, wherein the determining further comprises applying, with the project selection computing device, one or more research project metrics to the one or more research project criteria, wherein the determined selection of one or more research projects for each of the obtained IT-led innovation projects is further based on the applied one or more research project metrics, wherein applying the one or more research project metrics further comprises obtaining, by the project selection computing device, a research project weight for each of the one or more research project criteria, wherein the research project weights are defined based on a relative impact of the one or more research project criteria in evaluating a feasibility of implementing the research project;

selecting, with the project selection computing device, one of the obtained IT-led innovation projects based at least on the determined selection of one or more research projects for each of the obtained IT-led innovation projects and one or more innovation project criteria, wherein the selecting further comprises applying, with the project selection computing device, one or more innovation project metrics to the one or more innovation project criteria, wherein the selecting with the project selection computing device one of the obtained IT-led innovation projects is further based on the applied one or more innovation project metrics, wherein applying the one or more innovation project metrics further comprises obtaining, by the project selection computing device, an innovation project weight for each of the one or more innovation project criteria, wherein the innovation project weights are defined based on a relative impact of the one or more innovation project criteria in evaluating a feasibility of implementing the IT-led innovation project; and providing, with the project selection computing device, the selection of the one of the obtained IT-led innovation projects.

4. The method as set forth in claim 3, wherein applying the one or more research project metrics further comprises obtaining, by the project selection computing device, research project scores for each of the research projects based on a predefined scale, with reference to each of the one or more research project criteria; and wherein applying the one or more innovation project metrics further comprises obtaining, by the project selection computing device, innovation project scores for each of the obtained IT-led innovation projects based on a predefined scale, with reference to each of the one or more innovation project criteria.

5. The method as set forth in claim 4, wherein applying the one or more research project metrics further comprises obtaining, by the project selection computing device, a research project probability for each of the obtained research project scores, wherein the research project probability is a measure of uncertainty in the research project score; and wherein applying the one or more innovation project metrics further comprises obtaining, by the project selection computing device, an innovation project probability for each of the obtained innovation project scores, wherein the innovation project probability is a measure of uncertainty in the innovation project score.

6. The method as set forth in claim 5, wherein applying the one or more research project metrics further comprises calculating, by the project selection computing device, a research project utility value for each of the research projects, with reference to each of the one or more research project criteria, wherein each research project utility value is calculated based on the research project weights and the research project probabilities associated with the research project; and wherein applying the one or more innovation project metrics further comprises calculating, by the project selection computing device, an innovation project utility value for each of the obtained IT-led innovation projects, with reference to each of the one or more innovation project criteria, wherein each innovation project utility value is calculated based on the innovation project weights and the innovation project probabilities associated with the IT-led innovation project.

7. The method as set forth in claim 6, wherein the determining is based on the calculated research project utility values; and wherein, the selecting is based on the calculated innovation project utility values.

8. The method as set forth in claim 3, wherein the one or more research project criteria comprises one or more research project sub-criteria; and wherein the one or more innovation project criteria comprises one or more innovation project sub-criteria.

9. The method as set forth in claim 8, wherein obtaining a research project weight further comprises obtaining, by the project selection computing device, a research project weight for each of the one or more research project sub-criteria; and wherein obtaining an innovation project weight further comprises obtaining, by the project selection computing device, an innovation project weight for each of the one or more innovation project sub-criteria.

10. A computer-readable storage medium having stored thereon instructions for selecting one of a plurality of information technology (IT)-led innovation projects, the instructions comprising machine executable code which, when executed by at least one processor, causes the processor to perform steps comprising:

obtaining a plurality of IT-led innovation projects;

determining a selection of one or more research projects for each of the obtained IT-led innovation projects based at least on one or more research project criteria;

selecting one of the obtained IT-led innovation projects based at least on the determined selection of one or more research projects for each of the obtained IT-led innovation projects and one or more innovation project criteria; and wherein at least one of:

the determining further comprises obtaining a research project weight for at least one of the one or more research project criteria and applying one or more research project metrics to the one or more research project criteria with the obtained research project weight applied to the at least one of the one or more research project criteria, the research project weight is defined based on a relative impact of the at least one of the one or more research project criteria in evaluating a feasibility of implementing the research project; or the selecting further comprises obtaining an innovation project weight for at least one of the one or more innovation project criteria and applying one or more innovation project metrics to the one or more innovation project criteria with the obtained innovation project weight applied to the at least one of the one or more innovation project criteria, the innovation project weight is defined based on a relative impact of the at least one of the one or more innovation project criteria in evaluating a feasibility of implementing the IT-led innovation project;

providing the selection of the one of the obtained IT-led innovation projects.

11. The medium as set forth in claim 10, wherein each of the research project criteria and the innovation project criteria comprises at least one of customer orientation, commercial viability, strategic fit, resource availability, ease of execution, financial fit, learning and growth, enabling diffusion, customer adoption, customer delight, market expansion, or intellectual capital.

12. A computer-readable storage medium having stored thereon instructions for selecting one of a plurality of information technology (IT)-led innovation projects, the instructions comprising machine executable code which, when executed by at least one processor, causes the processor to perform steps comprising:

obtaining a plurality of IT-led innovation projects;

determining a selection of one or more research projects for each of the obtained IT-led innovation projects based at least on one or more research project criteria, wherein the determining further comprises applying one or more research project metrics to the one or more research project criteria, wherein the determined selection of one or more research projects for each of the obtained IT-led innovation projects is further based on the applied one or more research project metrics, wherein applying the one or more research project metrics further comprises obtaining a research project weight for each of the one or more research project criteria, wherein the research project weights are defined based on a relative impact of the one or more research project criteria in evaluating a feasibility of implementing the research project;

selecting one of the obtained IT-led innovation projects based at least on the determined selection of one or more research projects for each of the obtained IT-led innovation projects and one or more innovation project criteria, wherein the selecting further comprises applying one or more innovation project metrics to the one or more innovation project criteria, wherein the selecting one of the obtained IT-led innovation projects is further based on the applied one or more innovation project metrics, wherein applying the one or more innovation project metrics further comprises obtaining an innovation project weight for each of the one or more innovation project criteria, wherein the innovation project weights are defined based on a relative impact of the one or more innovation project criteria in evaluating a feasibility of implementing the IT-led innovation project; and providing the selection of the one of the obtained IT-led innovation projects.

13. The medium as set forth in claim 12, wherein applying the one or more research project metrics further comprises obtaining research project scores for each of the research projects based on a predefined scale, with reference to each of the one or more research project criteria; and wherein applying the one or more innovation project metrics further comprises obtaining innovation project scores for each of the obtained IT-led innovation projects based on a predefined scale, with reference to each of the one or more innovation project criteria.

14. The medium as set forth in claim 13, wherein applying the one or more research project metrics further comprises obtaining a research project probability for each of the obtained research project scores, wherein the research project probability is a measure of uncertainty in the research project score; and wherein applying the one or more innovation project metrics further comprises obtaining an innovation project probability for each of the obtained innovation project scores, wherein the innovation project probability is a measure of uncertainty in the innovation project score.

15. The medium as set forth in claim 14, wherein applying the one or more research project metrics further comprises calculating a research project utility value for each of the research projects, with reference to each of the one or more research project criteria, wherein each research project utility value is calculated based on the research project weights and the research project probabilities associated with the research project; and wherein applying the one or more innovation project metrics further comprises calculating an innovation project utility value for each of the obtained IT-led innovation projects, with reference to each of the one or more innovation project criteria, wherein each innovation project utility value is calculated based on the innovation project weights and the innovation project probabilities associated with the IT-led innovation project.

16. The medium as set forth in claim 15, wherein the determining is based on the calculated research project utility values; and wherein, the selecting is based on the calculated innovation project utility values.

17. The medium as set forth in claim 12, wherein the one or more research project criteria comprises one or more research project sub-criteria; and wherein the one or more innovation project criteria comprises one or more innovation project sub-criteria.

18. The medium as set forth in claim 17, wherein obtaining a research project weight further comprises obtaining a research project weight for each of the one or more research project sub-criteria; and wherein obtaining an innovation project weight further comprises obtaining an innovation project weight for each of the one or more innovation project sub-criteria.

19. A project selection computing device for selecting one of a plurality of information technology (IT)-led innovation projects, the project selection computing device comprising:

one or more processors; and a memory coupled to the one or more processors which are configured to execute programmed instructions stored in the memory, the programmed instructions comprising:

obtaining a plurality of IT-led innovation projects;

determining a selection of one or more research projects for each of the obtained IT-led innovation projects based at least on one or more research project criteria;

selecting one of the obtained IT-led innovation projects based at least on the determined selection of one or more research projects for each of the obtained IT-led innovation projects and one or more innovation project criteria; and wherein at least one of:

the determining further comprises obtaining a research project weight for at least one of the one or more research project criteria and applying one or more research project metrics to the one or more research project criteria with the obtained research project weight applied to the at least one of the one or more research project criteria, the research project weight is defined based on a relative impact of the at least one of the one or more research project criteria in evaluating a feasibility of implementing the research project; or the selecting further comprises obtaining an innovation project weight for at least one of the one or more innovation project criteria and applying one or more innovation project metrics to the one or more innovation project criteria with the obtained innovation project weight applied to the at least one of the one or more innovation project criteria, the innovation project weight is defined based on a relative impact of the at least one of the one or more innovation project criteria in evaluating a feasibility of implementing the IT-led innovation project;

providing the selection of the one of the obtained IT-led innovation projects.

20. The device as set forth in claim 19, wherein each of the research project criteria and the innovation project criteria comprises at least one of customer orientation, commercial viability, strategic fit, resource availability, ease of execution, financial fit, learning and growth, enabling diffusion, customer adoption, customer delight, market expansion, or intellectual capital.

21. A project selection computing device for selecting one of a plurality of information technology (IT)-led innovation projects, the project selection computing device comprising:
   one or more processors; and
   a memory coupled to the one or more processors which are configured to execute programmed instructions stored in the memory, the programmed instructions comprising:
      obtaining a plurality of IT-led innovation projects;
      determining a selection of one or more research projects for each of the obtained IT-led innovation projects based at least on one or more research project criteria, wherein the determining further comprises applying one or more research project metrics to the one or more research project criteria, wherein the determined selection of one or more research projects for each of the obtained IT-led innovation projects is further based on the applied one or more research project metrics, wherein applying the one or more research project metrics further comprises obtaining a research project weight for each of the one or more research project criteria, wherein the research project weights are defined based on a relative impact of the one or more research project criteria in evaluating a feasibility of implementing the research project;
      selecting one of the obtained IT-led innovation projects based at least on the determined selection of one or more research projects for each of the obtained IT-led innovation projects and one or more innovation project criteria, wherein the selecting further comprises applying one or more innovation project metrics to the one or more innovation project criteria, wherein the selecting one of the obtained IT-led innovation projects is further based on the applied one or more innovation project metrics, wherein applying the one or more innovation project metrics further comprises obtaining an innovation project weight for each of the one or more innovation project criteria, wherein the innovation project weights are defined based on a relative impact of the one or more innovation project criteria in evaluating a feasibility of implementing the IT-led innovation project; and
      providing the selection of the one of the obtained IT-led innovation projects.

22. The device as set forth in claim 21, wherein applying the one or more research project metrics further comprises obtaining research project scores for each of the research projects based on a predefined scale, with reference to each of the one or more research project criteria; and
   wherein applying the one or more innovation project metrics further comprises obtaining innovation project scores for each of the obtained IT-led innovation projects based on a predefined scale, with reference to each of the one or more innovation project criteria.

23. The device as set forth in claim 22, wherein applying the one or more research project metrics further comprises obtaining a research project probability for each of the obtained research project scores, wherein the research project probability is a measure of uncertainty in the research project score; and
   wherein applying the one or more innovation project metrics further comprises obtaining an innovation project probability for each of the obtained innovation project scores, wherein the innovation project probability is a measure of uncertainty in the innovation project score.

24. The device as set forth in claim 21, wherein the one or more research project criteria comprises one or more research project sub-criteria; and
   wherein the one or more innovation project criteria comprises one or more innovation project sub-criteria.

25. The device as set forth in claim 23, wherein applying the one or more research project metrics further comprises calculating a research project utility value for each of the research projects, with reference to each of the one or more research project criteria, wherein each research project utility value is calculated based on the research project weights and the research project probabilities associated with the research project; and
   wherein applying the one or more innovation project metrics further comprises calculating an innovation project utility value for each of the obtained IT-led innovation projects, with reference to each of the one or more innovation project criteria, wherein each innovation project utility value is calculated based on the innovation project weights and the innovation project probabilities associated with the IT-led innovation project.

26. The device as set forth in claim 25, wherein the determining is based on the calculated research project utility values; and
   wherein, the selecting is based on the calculated innovation project utility values.

27. The device as set forth in claim 26, wherein obtaining a research project weight further comprises obtaining a research project weight for each of the one or more research project sub-criteria; and
   wherein obtaining an innovation project weight further comprises obtaining an innovation project weight for each of the one or more innovation project sub-criteria.

* * * * *